(12) United States Patent
Savva et al.

(10) Patent No.: US 9,284,023 B2
(45) Date of Patent: Mar. 15, 2016

(54) BOAT ANCHOR WINCH

(71) Applicant: SAVWINCH PTY LT, Keilor Downs, Victoria (AU)

(72) Inventors: Nick Savva, Keilor Downs (AU); Michael Strzelczyk, Keilor East (AU)

(73) Assignee: SAVWINCH PTY LTD, Keilor Downs (AU)

( * ) Notice: Subject to any disclaimer, the term of this patent is extended or adjusted under 35 U.S.C. 154(b) by 0 days.

(21) Appl. No.: 14/352,337

(22) PCT Filed: Oct. 24, 2012

(86) PCT No.: PCT/AU2012/001294
§ 371 (c)(1),
(2) Date: Apr. 17, 2014

(87) PCT Pub. No.: WO2013/059862
PCT Pub. Date: May 2, 2013

(65) Prior Publication Data
US 2014/0239871 A1    Aug. 28, 2014

(30) Foreign Application Priority Data
Oct. 26, 2011    (AU) .................................. 2011904420

(51) Int. Cl.
*B65H 77/00* (2006.01)
*B65H 59/38* (2006.01)
(Continued)

(52) U.S. Cl.
CPC .................. *B63B 21/16* (2013.01); *B63B 21/22* (2013.01); *B66D 1/12* (2013.01); *B66D 1/40* (2013.01); *B66D 1/72* (2013.01); *H02P 7/06* (2013.01); *B63B 2708/02* (2013.01)

(58) Field of Classification Search
CPC ............ H02J 7/0031; H02J 9/002; H02J 7/00; H02J 7/0052; H02J 7/007; H02J 7/02; H02J 7/022; Y10S 187/901; Y10T 29/49826; A62B 1/14; B60N 2/0232; B60N 2/0244; B60N 2/0276; B66C 13/26; G05B 19/416
USPC ......... 318/6, 280, 400.15, 432, 434, 563, 504; 187/281, 290, 296; 254/278
See application file for complete search history.

(56) References Cited

U.S. PATENT DOCUMENTS 3,565,402 A * 2/1971 Linke .............................. 254/269
3,777,855 A * 12/1973 Boyldew et al. ............... 187/295
(Continued)

FOREIGN PATENT DOCUMENTS

AU        2007202070 B1    12/2007

OTHER PUBLICATIONS

Australian Patent Office, International Search Report on PCT/AU2012/001294, Mailed Dec. 12, 2012, Woden Act 2606, Australia.

*Primary Examiner* — Paul Ip
(74) *Attorney, Agent, or Firm* — Louis Ventre, Jr.

(57) ABSTRACT

The invention provides a winch and method for raising and lowering a boat anchor attached to an anchor rope, comprising: an electric motor (10) operable to turn the winch in a rope raising direction or a rope lowering direction and powered from a power source supplying a supply voltage; and a boost controller (CB1-3,S1-2,K1-6,Kx1-4,25,30) for applying a boosted voltage higher than the supply voltage to the motor (10) so as to increase a turning speed of the motor when the motor is operating in the rope lowering direction.

5 Claims, 3 Drawing Sheets

(51) Int. Cl.
  *B63B 21/16* (2006.01)
  *B66D 1/12* (2006.01)
  *B63B 21/22* (2006.01)
  *B66D 1/40* (2006.01)
  *B66D 1/72* (2006.01)
  *H02P 7/06* (2006.01)

(56) References Cited

U.S. PATENT DOCUMENTS

| | | | | |
|---|---|---|---|---|
| 4,276,498 | A * | 6/1981 | Stager et al. | 318/6 |
| 5,208,518 | A * | 5/1993 | Grapenthin et al. | 318/400.09 |
| 5,210,473 | A * | 5/1993 | Backstrand | 318/99 |
| 5,296,791 | A * | 3/1994 | Hipp | 318/563 |
| 5,965,994 | A * | 10/1999 | Seo | 318/280 |
| 6,874,763 | B2 * | 4/2005 | Sozzi | 254/278 |
| 7,021,427 | B2 * | 4/2006 | Skovgaard et al. | 187/281 |
| 7,104,212 | B2 * | 9/2006 | Brianza | 114/144 RE |
| 7,342,370 | B2 * | 3/2008 | Greene et al. | 318/432 |
| 7,569,996 | B2 * | 8/2009 | Holmes et al. | 315/291 |
| 7,960,920 | B2 * | 6/2011 | Holmes et al. | 315/291 |
| 8,076,885 | B2 * | 12/2011 | Heravi et al. | 318/434 |
| 8,196,899 | B2 * | 6/2012 | Hager | 254/343 |
| 8,207,692 | B2 * | 6/2012 | Holmberg et al. | 318/6 |
| 8,299,726 | B2 * | 10/2012 | Holmes et al. | 315/291 |
| 2003/0107030 | A1 * | 6/2003 | Sozzi | 254/362 |
| 2004/0118639 | A1 * | 6/2004 | Skovgaard et al. | 187/296 |
| 2005/0068459 | A1 * | 3/2005 | Holmes et al. | 348/372 |
| 2005/0126468 | A1 * | 6/2005 | Brianza | 114/382 |
| 2005/0207196 | A1 * | 9/2005 | Holmes et al. | 363/126 |
| 2007/0200104 | A1 * | 8/2007 | Davis | 254/342 |
| 2009/0284877 | A1 * | 11/2009 | Heravi et al. | 361/31 |
| 2010/0060203 | A1 * | 3/2010 | Holmes et al. | 315/307 |
| 2010/0116191 | A1 * | 5/2010 | Holmberg et al. | 114/230.21 |
| 2011/0049450 | A1 * | 3/2011 | Hager | 254/343 |
| 2011/0071684 | A1 * | 3/2011 | Holmberg | 700/275 |
| 2011/0120810 | A1 * | 5/2011 | Schroeder-Brumloop et al. | 187/290 |
| 2011/0175743 | A1 * | 7/2011 | Brickell | 340/635 |
| 2011/0204821 | A1 * | 8/2011 | Holmes et al. | 315/307 |
| 2011/0271891 | A1 * | 11/2011 | Holmberg et al. | 114/230.1 |
| 2012/0019212 | A1 * | 1/2012 | Krauer | 320/137 |
| 2012/0206074 | A1 * | 8/2012 | Kureck et al. | 318/400.15 |
| 2013/0056695 | A1 * | 3/2013 | Cazzaro et al. | 254/371 |
| 2013/0264965 | A1 * | 10/2013 | Holmes et al. | 315/291 |

* cited by examiner

BOAT ANCHOR WINCH

FIELD

The present invention relates to boat anchor winches typically used in pleasure craft and other water vessels, and in particular to an improved motorized winch.

BACKGROUND

Electrically powered boat anchor winches are a common labour saving device on pleasure craft. The simplest and cheapest form involves a winch with a single speed DC electric motor wired into a 12V or 24V battery for raising and lowering the anchor.

A disadvantage of this simple form is that it takes much longer to deploy the anchor than with a manual winch, as the safe speed for raising the anchor is much slower than the safe speed for lowering the anchor.

A solution known in the art is to incorporate a clutch release mechanism, whereby the motor can be disengaged and anchor can be allowed to drop to the ocean floor unhindered by the motor speed. Such mechanisms add considerable cost and complexity and can be unreliable.

Variable or multiple speed electric winches are known, but prior art variable speed winches either utilize complex gears or operate only to variably reduce the voltage applied to the motor from the 12V battery. In such devices the variable speeds are typically used for the purpose of reduction of the maximum raising speed for certain tasks.

There is therefore a need for an improved approach to the provision of rapid anchor lowering in an electrically powered boat anchor winch.

The inventors have realized that a relatively inexpensive and highly reliable controller can be added to a simple one speed electric winch to provide reliable rapid anchor lowering.

SUMMARY OF THE INVENTION

According to a first broad aspect of the invention there is provided a winch for raising and lowering a boat anchor attached to an anchor rope comprising:

an electric motor operable to turn the winch in a rope raising direction or a rope lowering direction and powered from a power source supplying a supply voltage; and a boost controller for applying a boosted voltage higher than the supply voltage to the motor so as to increase a turning speed of the motor when the motor is operating in the rope lowering direction.

In one embodiment, the voltages are DC voltages.

In one embodiment, the winch further comprises a selector switch to enable or disable the boosted voltage.

In one embodiment, the boosted voltage is produced with the aid of a boost converter. The boost controller may further comprise a motor speed controller electrically connected between the boost converter and the motor. The motor speed controller may further comprise a potentiometer for user adjustment of the boosted voltage.

In one embodiment, the boost controller may further comprise a soft start circuit to enable smooth engagement of the boosted voltage to the motor on startup. The soft start circuit may be integral with the motor speed controller.

In one embodiment, the boost controller is unable to apply the boosted voltage when the motor is operating in the rope raising direction.

In one embodiment, the power source is a 12V or 24V DC battery.

According to a second broad aspect of the invention there is provided a method of providing a motorized anchor winch powered from a power source supplying a supply voltage with the capability of lowering the anchor faster than raising the anchor, the method comprising the step of applying a boosted voltage higher than the supply voltage to the motor when the motor is operating in a rope lowering direction.

DETAILED DESCRIPTION OF EMBODIMENTS

An embodiment of the current invention will now be described.

Figure 1:
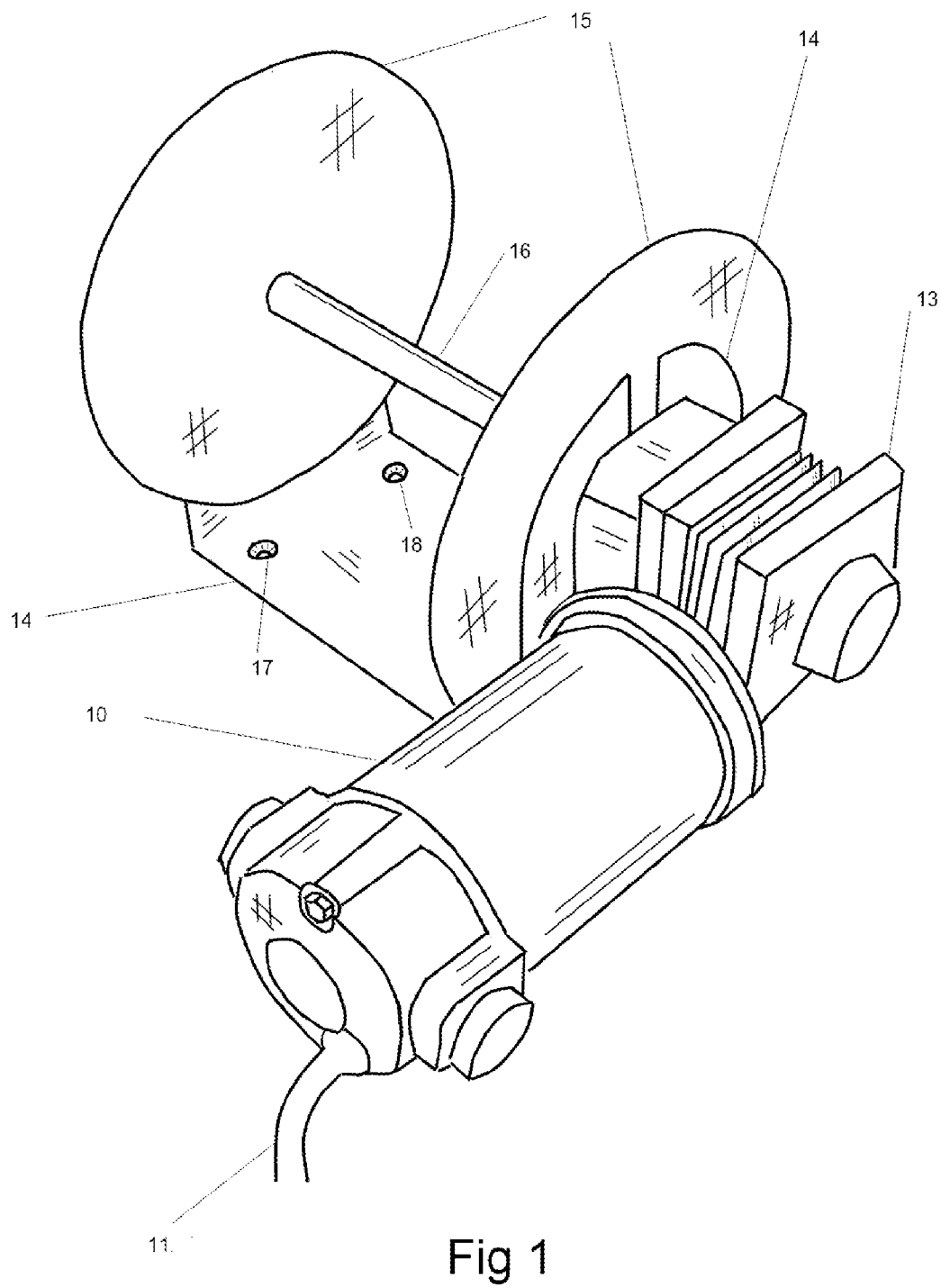
FIG. 1 is a diagram of a typical motorized boat anchor winch to which the invention may be applied.

Referring first to FIG. 1, an electrically operated boat anchor winch is shown, as included in embodiments of the invention. 12 V DC electric motor 10 rated at 1000 Watts power output has electrical power input lead 11. Motor 10 drives worm drive gearbox 13 mounted on bracket 14. Bracket 14 has number of attachment points such as 17, 18 for mounting to the boat by screws. Mounted on bracket 14 by bearings and turned by an output shaft of gearbox 13 is a winch drum with spindle 15, 16 around which the anchor rope is wound and unwound.

Figure 2:
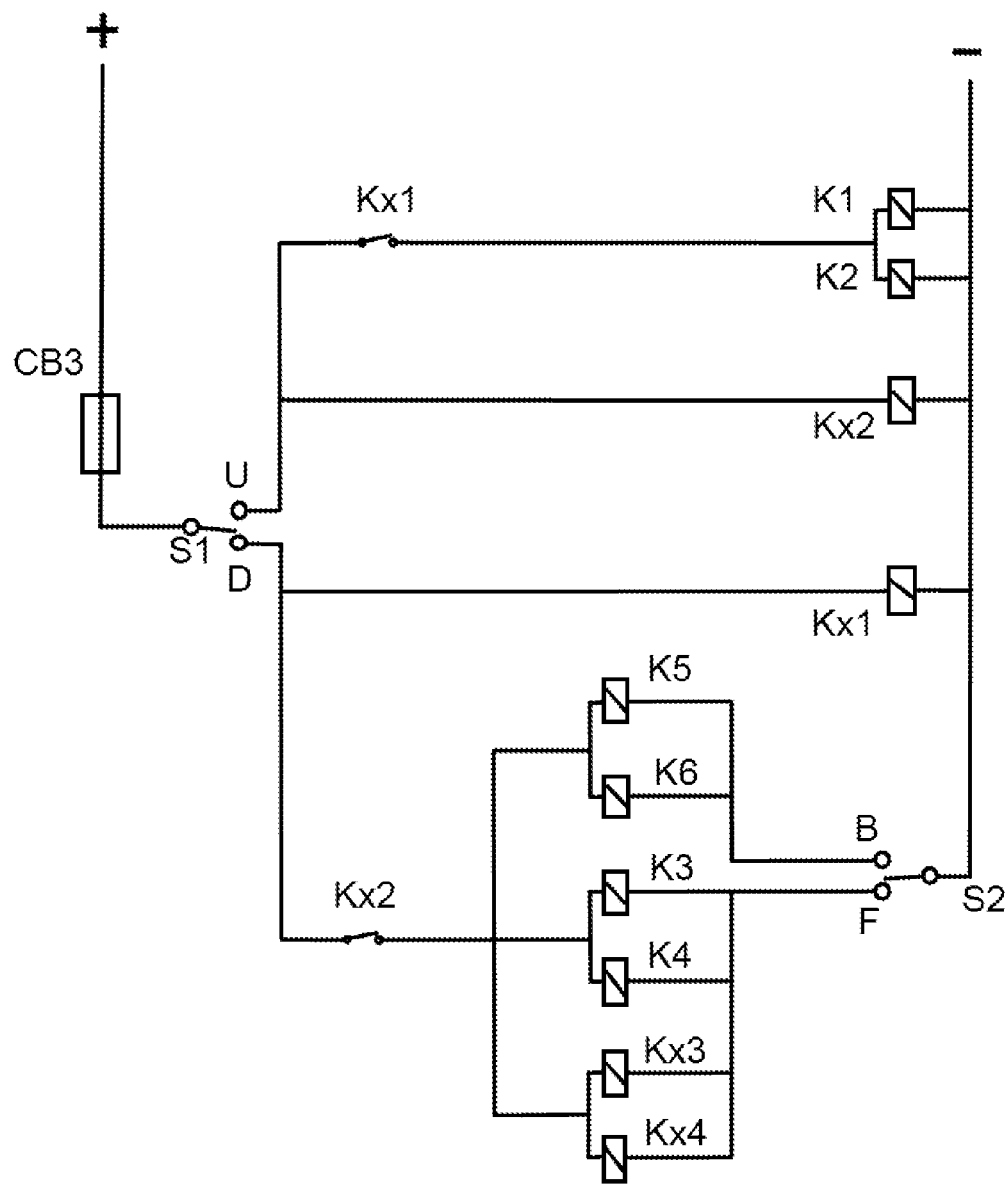
FIG. 2 is a circuit diagram of a control circuit part of a boost controller in accordance with an embodiment of the invention.
Figure 3:
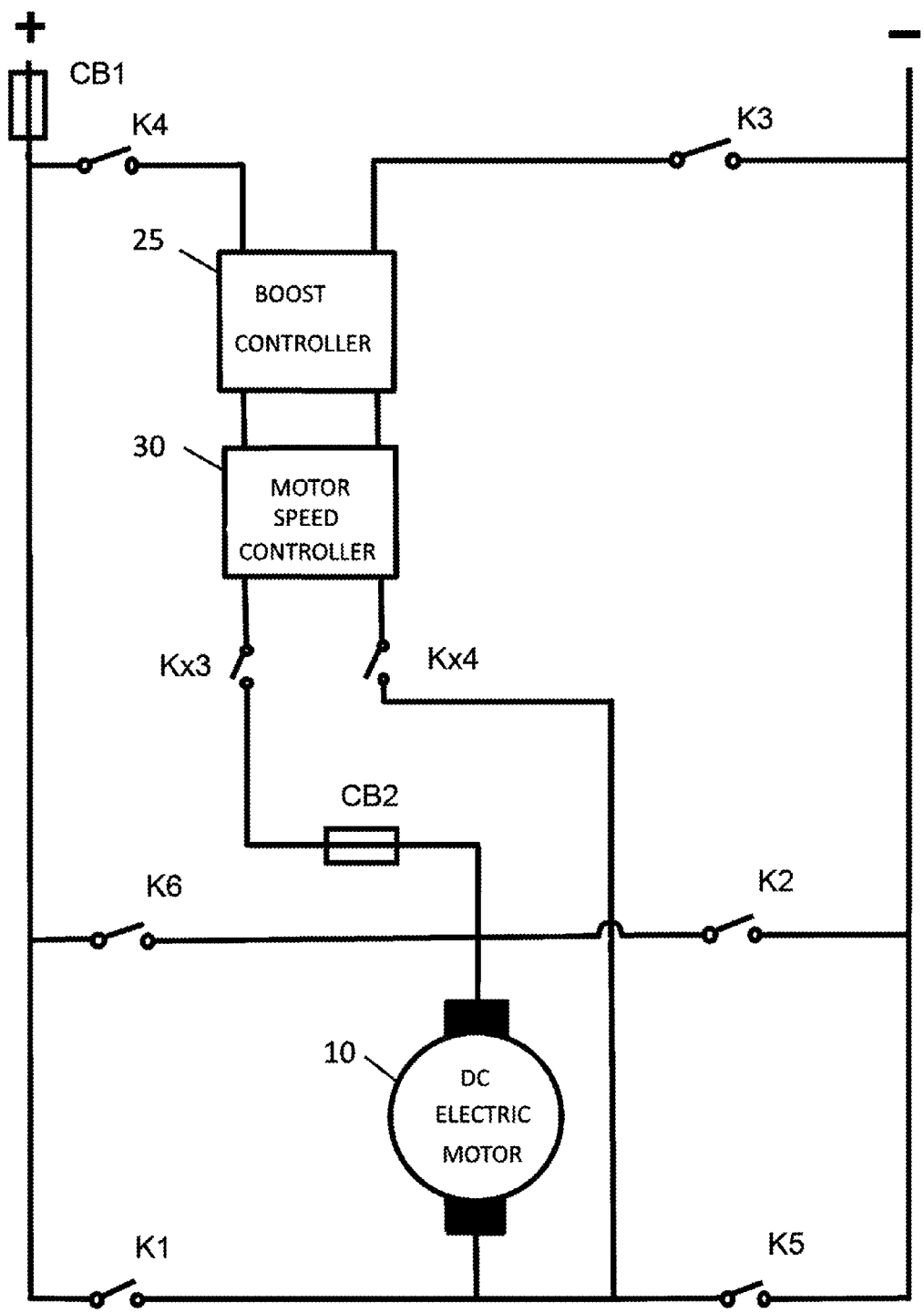
FIG. 3 is a circuit diagram of a power circuit adapted to operate with the control circuit of FIG. 2.

Referring now to FIGS. 2 and 3, the boost controller of an embodiment of the invention is exemplified, divided into a control circuit (FIG. 2) and a power circuit (FIG. 3). Labels + and − denote connection to the positive and negative terminals of a 12 V DC battery. Control sides of a relay are labelled with a rectangle with a diagonal line, and controlled sides as a switch in a normally closed or normally open position.

Circuit breaker CB3 (5 A) protects the control circuit and circuit breaker CB1 (50 A) protects the power circuit. Up-down switch S1 operates to switch the motor between a rope raising direction in position U and a rope lowering direction in position D.

When S1 is in position U, interlock relay Kx2 (3 A, 12V) is energized to open its normally closed switch, disconnecting the down control circuitry. Similarly, interlock relay Kx1 is de-energized and its normally-closed switch is kept closed. Relays K1 and K2 (60 A, 12V) are therefore energized, closing their normally open switches and presenting 12V across motor 10 in an anchor raising polarity.

When S1 is in position D, the converse applies with the interlock relays and the down control circuitry operates. If switch S2 (manually operable by the user) is in the bypass B position, the boosting circuitry is disabled, K5 and K6 (12V, 60 A, normally open) being energized and closed and presenting 12 V across motor 10 in an anchor-lowering polarity. If switch S2 is in the fast fall F position, the boosting circuitry is enabled with K3 and K4 energized (60 A, 12V, normally open), applying 12V across the inputs of 12V to 24 V (15 A) DC to DC boost (step up) converter 25, as are isolation relays Kx3 and Kx4 (12 VDC, 30 A, normally open), applying the voltage output from motor speed controller 30 through circuit breaker CB2 (20 A) across motor 10 in an anchor lowering polarity.

Motor speed controller 30 is a standard motor speed controller (12V-36V DC, 50 A) that can supply a reduced voltage by pulse width modulation, to which may be fitted a potentiometer for the user to adjust the pulse width and hence the boosted voltage downwards from 24V, so as to suit the particular anchor. Ideally, the boosted speed is as fast as is allowable so that the anchor falls without slackening of the anchor rope and potential tangling. Typically, the user will adjust the potentiometer once on installation and thereafter use the switch S2 to enable the boosted speed. A second advantage of the motor speed controller 30 is that it incorporates a soft start capacitor circuit that enables smoothed engagement of the applied voltage to the motor over 1-3 seconds, reducing the high current on startup which otherwise can damage the boost converter.

By providing a boosted voltage to the motor when operating in the rope lowering direction, equivalent functionality to a clutch arrangement can be provided without mechanical modification or mechanical enhancement of a single speed base model winch, increasing simplicity and providing increased reliability over a clutch. Electric motors rated for 12 V operation in the rope raising (loaded) condition are well able to operate faster with 24 V input, particularly when this is applied in the rope lowering condition, which is unloaded or negatively loaded by the weight of the anchor.

Persons skilled in the art will also appreciate that many variations may be made to the invention without departing from the scope of the invention.

For example, the invention applies to anchor motors of various sizes and powers and normal operating voltages, including but not limited to 12V and 24 V DC systems and also AC systems. Also, although it is preferred to provide the voltage boost only in the rope lowering direction, other embodiments can also provide the voltage boost in both rope raising and lowering directions.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A device for raising and lowering a boat anchor, the device comprising:
    a winch for driving the boat anchor;
    a DC electric motor connected to the winch without a clutch release mechanism and operable to turn the winch in the anchor raising direction or the anchor lowering direction and powered from a DC power source supplying a DC supply voltage;
    an up control circuitry adapted to connect the DC power source to the DC electric motor in a polarity which turns the winch in the anchor raising direction;
    a down control circuitry adapted to connect the DC power source to the DC electric motor in a polarity which turns the winch in the anchor lowering direction;
    an up-down switch connected to the up control circuitry and the down control circuitry and configured to energize the up control circuitry and de-energize the down control circuitry in an up position of the up-down switch, and configured to energize the down control circuitry and de-energize the up control circuitry in a down position of the up-down switch;
    a boosting circuitry within the down control circuitry comprising a DC to DC boost converter which operates when energized to convert the DC supply voltage to a boosted DC voltage higher than the DC supply voltage;
    wherein when the up-down switch is in the up position, the up control circuitry supplies the DC supply voltage to the DC electric motor;
    wherein when the up-down switch is in the down position and the boosting circuitry is energized, the down control circuitry supplies the boosted DC voltage to the DC electric motor so as to provide an increased turning speed of the DC electric motor and thereby rapid lowering the anchor.

2. The device of claim 1, wherein the boosted DC voltage is greater than a rated voltage of the DC electric motor.

3. The device of claim 1 further comprising a boost control switch within the down control circuit having a boost position and a bypass position, the boost control switch being configured within the down control circuit when the up-down switch is in the down position to:
    energize the boost control circuitry when the boost control switch is in the boost position and supply the boosted DC voltage to the DC electric motor; and
    to de-energize the boost control circuit when the boost control switch is in the bypass position and supply the DC voltage to the DC electric motor.

4. The device of claim 1, wherein the boosting circuitry further comprises a motor speed controller electrically connected between the DC to DC boost converter and the DC electric motor, fitted with an adjustable potentiometer configured to permit user adjustment of the boosted DC voltage.

5. The device of claim 4, wherein the motor speed controller comprises a soft start capacitor circuit to enable smooth engagement of the boosted voltage to the DC electric motor on startup.

* * * * *